United States Patent
Heppe (10) Patent No.: US 8,668,161 B2
(45) Date of Patent: Mar. 11, 2014

(54) SYSTEMS AND METHODS FOR LONG ENDURANCE STRATOSPHERIC OPERATIONS

(75) Inventor: Stephen Heppe, Hood River, OR (US)

(73) Assignee: Stratospheric Airships, LLC, Hood River, OR (US)

( * ) Notice: Subject to any disclaimer, the term of this patent is extended or adjusted under 35 U.S.C. 154(b) by 208 days.

(21) Appl. No.: 13/228,212

(22) Filed: Sep. 8, 2011

(65) Prior Publication Data

US 2012/0234965 A1    Sep. 20, 2012

Related U.S. Application Data

(63) Continuation-in-part of application No. 13/159,215, filed on Jun. 13, 2011, and a continuation-in-part of application No. 13/048,625, filed on Mar. 15, 2011.

(51) Int. Cl.
*B64C 37/02* (2006.01)
(52) U.S. Cl.
USPC .......... 244/2; 244/29; 244/30; 244/31; 244/33
(58) Field of Classification Search
USPC .................. 244/2, 30, 24, 29, 31, 33
See application file for complete search history.

(56) References Cited

U.S. PATENT DOCUMENTS

| | | | | |
|---|---|---|---|---|
| 213,603 | A * | 3/1879 | Apraxine | 244/33 |
| 1,549,061 | A | 8/1923 | Chenu | |
| 1,372,924 | A | 3/1929 | Anderson | |
| 1,818,138 | A | 8/1931 | Howland | |
| 2,365,778 | A * | 12/1944 | Schwab | 89/1.11 |
| 2,863,618 | A | 12/1958 | Doyle et al. | |
| 3,260,480 | A * | 7/1966 | Ash et al. | 244/31 |
| 3,279,419 | A * | 10/1966 | DeMarco | 116/210 |
| 3,412,958 | A * | 11/1968 | Struble, Jr. | 244/33 |
| 3,424,405 | A * | 1/1969 | Struble, Jr. | 244/31 |
| 3,605,329 | A * | 9/1971 | Dalli | 446/225 |
| 3,834,655 | A * | 9/1974 | Crosby, Jr. | 244/135 R |
| 4,082,063 | A | 4/1978 | Strickland | |
| 4,365,772 | A * | 12/1982 | Ferguson | 244/33 |
| 4,601,444 | A * | 7/1986 | Lindenbaum | 244/26 |
| 4,695,012 | A * | 9/1987 | Lindenbaum | 244/26 |
| 4,995,572 | A | 2/1991 | Piasecki | |

(Continued)

FOREIGN PATENT DOCUMENTS

GB    2141088 A    12/1984

OTHER PUBLICATIONS

Naval Research Advisory Committe, Lighter-Than-Air Systems for Future Naval Missions, Flag Officers and Senior Executive Service, The Pentagon Auditorium, Oct. 4, 2005.

(Continued)

*Primary Examiner* — Tien Dinh
*Assistant Examiner* — Justin Benedik
(74) *Attorney, Agent, or Firm* — Jeffrey K. Riddle; Van Cott, Bagley, Cornwall & McCarthy P.C.

(57) ABSTRACT

An illustrative airship system for long endurance stratospheric operations includes an upper airship and a first end of a tether attached to the upper airship. A lower airship is attached to a second end of the tether and a payload airship is reversibly mated to the lower airship. The airship system is free flying and configured to maintain long duration station keeping. Illustrative methods for long endurance stratospheric operations are also provided.

21 Claims, 3 Drawing Sheets

(56) References Cited

U.S. PATENT DOCUMENTS

| | | | |
|---|---|---|---|
| 5,857,645 | A | 1/1999 | Hodgson |
| 6,010,093 | A * | 1/2000 | Paulson .......................... 244/24 |
| 6,142,414 | A * | 11/2000 | Doolittle ........................ 244/25 |
| 6,220,543 | B1 | 4/2001 | Uskolovsky |
| 6,224,015 | B1 * | 5/2001 | Reinhard ........................ 244/24 |
| 6,422,506 | B1 | 7/2002 | Colby |
| 6,648,235 | B2 * | 11/2003 | Chan ........................... 236/25 A |
| 7,055,777 | B2 * | 6/2006 | Colting .......................... 244/30 |
| 7,708,222 | B2 | 5/2010 | Lee |
| 8,061,648 | B2 | 11/2011 | Lachenmeier |
| 2004/0195431 | A1 | 10/2004 | Yumlu et al. |
| 2006/0000945 | A1 * | 1/2006 | Voss ............................. 244/97 |
| 2008/0087762 | A1 * | 4/2008 | Holloman et al. .............. 244/30 |
| 2008/0179453 | A1 | 7/2008 | Thompson |
| 2012/0234964 | A1 * | 9/2012 | Heppe ............................. 244/2 |
| 2012/0234965 | A1 * | 9/2012 | Heppe ............................. 244/2 |
| 2012/0312911 | A1 * | 12/2012 | Heppe ............................. 244/2 |
| 2012/0312918 | A1 * | 12/2012 | Heppe ............................ 244/30 |
| 2012/0312919 | A1 * | 12/2012 | Heppe ............................ 244/30 |
| 2013/0037650 | A1 * | 2/2013 | Heppe ............................. 244/2 |

OTHER PUBLICATIONS

Sanswire Corporation, Unmanned Airship Solutions for Integrated ISR Systems; Technical White Paper, Jul. 24, 2007.

Graham Warwick, Higher ground: Stratospheric airships special report—Aug. 15, 2006—Washington DC—Flight International; Aug. 16, 2006.

Mitre, 12 Miles High; An Integrated Airship—Radar is on the Horizon, Mar. 15, 2010.

Craig L. Nickol et al., High Altitude Long Endurance UAV Analysis of Alternatives and Technology Requirements Development, NASA/TP-2007-214861; Mar. 2007.

George D. Modica et al., An Investigation of Stratospheric Winds in Support of the High Altitude Airship, Atmospheric and Environmental Research, Inc., Lexington, Massachusetts Systems Technology, Inc., Hawthorne, California; Sep. 21, 2010.

JP Aerospace, Something new at the boundary of Earth and space; Tandem Class Airships, http://www.jpaerospace.com/Tandem/tandem.html[Nov. 20, 2010 4:50:26 PM].

* cited by examiner

SYSTEMS AND METHODS FOR LONG ENDURANCE STRATOSPHERIC OPERATIONS

RELATED DOCUMENTS

The present application is a continuation-in-part and claims the benefit under 35 U.S.C. §120 to the following applications: U.S. application Ser. No. 13/048,625, filed Mar. 15, 2011 and entitled "Systems and Methods for Long Endurance Airship Operations"; U.S. application Ser. No. 13/159,215, filed Jun. 13, 2011 and entitled "Tethered Airships"; both of which are to Stephen Heppe and are incorporated herein by reference in their entirety.

BACKGROUND

For long-endurance stratospheric operations using airships, methods must be found to overcome the problems of leakage of lifting gas, degradation/failure of individual components and systems, and provision of energy for housekeeping, propulsion and station-keeping (if required for the mission) and payload operations. While it may be possible to rely on renewable energy sources for some missions (specifically, solar energy), the problems of leakage and component and subsystem degradation/failure remain. For truly long-endurance operations, which may extend indefinitely (i.e., which have no planned ending date or specific/finite mission duration), a way must be found to replenish lifting gas, replace or otherwise mitigate component and subsystem failures, and replenish fuel supplies (if the energy needs of the system are not fully accommodated by renewable sources such as solar energy).

Co-pending application Ser. No. 13/048,625 describes a tandem airship system which substantially reduces overall system cost, compared to traditional long-endurance stratospheric systems, by relying on a payload airship and a plurality of logistics airships. The payload airship can remain on-station indefinitely (barring failures) while it is sequentially tended by the plurality of logistics airships which provide, inter alia, power and station-keeping services. The logistics airships are cycled back-and-forth between a ground station (or stations) and the payload airship, as needed, as their consumables are depleted. A key factor affecting the depletion of consumables is the energy cost of propulsion needed for station-keeping.

Co-pending application Ser. No. 13/159,215 describes a tethered airship system which substantially reduces the energy cost of station-keeping (e.g., for long-endurance operations in the stratosphere) by relying on a tethered combination of two airships spaced far apart in altitude, such that the airships typically experience winds in opposite directions. However, the problem of gas leakage remains.

Co-pending application Ser. No. 13/227,966, entitled "Lifting Gas Replenishment in a Tethered Airship System," filed Sep. 8, 2011, describes a gas replenishment method and apparatus that can be used within the context of the tethered airship system previously disclosed, thereby overcoming the problem of gas leakage for the upper airship. However, this system relies on a gas reservoir on the lower airship. Eventually, this gas reservoir will become depleted.

Co-pending application Ser. Nos. 13/048,625, 13/159,215, and 13/227,966, are fully incorporated herein by reference. However, in this disclosure, unless explicitly stated otherwise, the term "mating" is assumed to also encompass the concept of "docking".

This invention is directed to the problem of long-endurance and open-ended (with respect to time) stratospheric missions, although the invention may find other applications. It combines a tethered airship system with gas replenishment, as described in Ser. Nos. 13/159,215 and 13/227,966, with a tandem support concept as described in Ser. No. 13/048,625, to provide for replenishment of lifting gas and fuel (if required) from the ground, replacement of failed subsystems/components, station-keeping, and shuttle of payloads to/from a mission area.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

Figure 1:
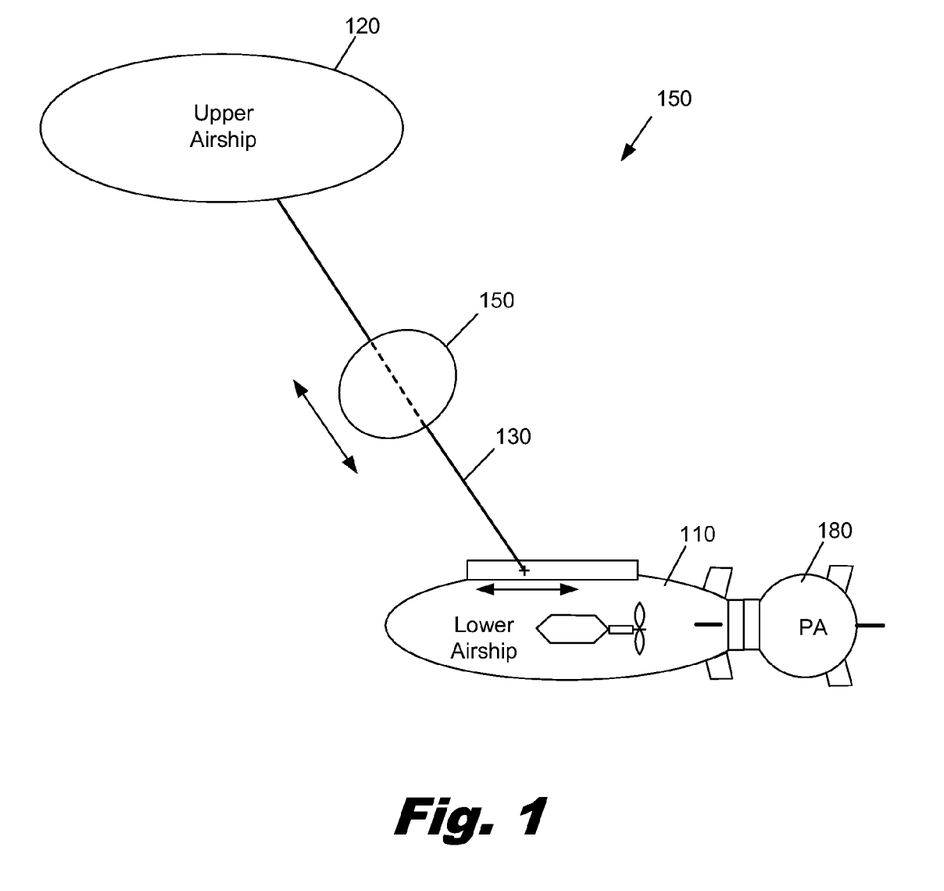
FIG. 1 is a schematic diagram identifying several of the subsystems of a tethered airship system designed to replenish the lifting gas of the upper airship with a reservoir of lifting gas carried by the lower airship, with the lower airship additionally "tending" an attached payload airship, according to one example of principles described herein.

FIG. 1 illustrates in schematic form a free flying tethered airship system with gas replenishment capability (for the upper airship 120), where the lower airship 110 is reversibly mated to a payload airship 180 so as to provide at least electrical power, and possibly other services such as (without limitation) lifting gas replenishment, station-keeping, and relay communications. Lifting gas replenishment for the upper airship is achieved through the operation of a shuttle 150, here illustrated as a balloon shuttle, running up and down along the tether 130 between the lower airship 110 and the upper airship 120. The upper airship 120 may comprise a variety of subsystems including a buoyant element such as a stratospheric balloon, a parafoil, a parachute, a solar collection/energy storage and power distribution system, electronics, actuators, and the like. As discussed in Ser. No. 13/159,215, a primary purpose of the upper airship and its associated systems is to provide for drag compensation so as to minimize station-keeping power requirements for the system as a whole (including the lower airship). Operational altitudes of the upper airship and lower airship are selected such that wind forces on the lower airship are in a substantially different direction than wind forces on the upper airship. The tether connects the upper airship and lower airship to allow the difference in winds to be used to minimize energy required to maintain station keeping. While the tether will generally be discussed as a single element, the reader should understand that the tether may comprise multiple elements which together provide tension between the lower airship and upper airship (and possibly other functions).

The lower airship 110 contains an energy and power distribution subsystem which may be based on renewable energy (e.g., solar), non-renewable (e.g., hydrogen fuel cells), or a hybrid system comprising both renewable and non-renewable sources. It also contains a replenishable reservoir of lifting gas in either cryogenic (cold liquid) or non-cryogenic (gaseous) form.[1] If the energy and power subsystem uses non-renewable sources in whole or in part, the lower airship also contains a replenishable reservoir of fuel. If the fuel is the same as the lifting gas (e.g., hydrogen), optionally a single reservoir may be used for both purposes. In some embodiments, the lower airship may contain a plurality of mating fixtures. The lower airship 110 may also comprise lift and drag adjustment subsystems such as a parafoil and parachute (not shown) which can be used to adjust lift and drag forces (in coordination with the upper airship) so as to minimize station-keeping power expenditures, and support maneuvering.

[1] The bulk of this disclosure will emphasize non-cryogenic handling of lifting gas, but this is not a limitation of the inventive concept.

The payload airship 180 is capable of maintaining an internal or external payload (not shown) at roughly a desired altitude, and may optionally provide for short-term unattended operations (i.e., when it is not mated to another airship such as the lower airship 110 illustrated in the figure). Short-term unattended operations could include, for example, autonomous power generation capability for housekeeping and payload operations, attitude control, and even propulsion and maneuvering (propulsion and maneuvering features are not explicitly shown). However, as illustrated, the payload airship 180 is typically mated to another airship (in this case the lower airship 110). The airships and mating fixtures are designed to provide for mating and demating and delivery of electrical power from the supporting airship (in this case lower airship 110) to the payload airship 180. In addition to electrical power, the airships and mating fixtures may be designed to deliver fluids (such as fuel and/or lifting gas, in liquid or gaseous form) from the supporting airship to the payload airship. FIG. 1 illustrates the payload airship 180 as reversibly mated to the lower airship 110 at the rear or stern of lower airship 110; however, this is not a limitation of the inventive concept. The payload airship could also be mated at the front or bow of the lower airship 110, or below (fully external carriage or in a "cavity" so that it is partially surrounded by the lower airship), or even above. The payload airship 180 can be detached from the lower airship and replaced by another payload airship as necessary to meet mission requirements.

Depending on the mating location, one or more of the lift and drag adjustment subsystems, described previously for the lower airship 110 in U.S. application Ser. No. 13/159,215, may instead, or in addition, be hosted by the payload airship 180. For example, if the payload airship is mated at the stern of the lower airship 110, the payload airship may support a parachute that can be used in lieu of the parachute previously described for the lower airship. Several alternative embodiments may be envisioned. For example, the tethered airship system by itself may not require a parachute on the lower airship (i.e., in the absence of a mated payload airship), but the system as a whole may require (or benefit from) a parachute when a payload airship is attached. In this case, the parachute could be supported on the payload airship alone and used, in accordance with the general principles described in U.S. application Ser. No. 13/159,215, when it is mated to the stern of the lower airship 110. Alternatively, the lower airship 110 could host the parachute and the payload airship 180 could be mated at the front (or bow) of the lower airship. In yet another embodiment, both the lower airship and the payload airship host a parachute, and the parachute of the lower airship is retracted and stowed safely prior to mating of the payload airship at the stern of the lower airship (i.e., so the lower airship uses its own parachute when there is no payload airship attached, and relies on the parachute hosted on the payload airship when there is a payload airship attached).

Similarly, if the payload airship is intended to mate with the lower airship in a "under-slung" configuration, multiple embodiments include a parafoil only on the payload airship, or on both the lower airship and the payload airship, with the lower airship's parafoil retracted and stowed safely prior to payload airship mating.

The inventive concept also includes embodiments where a parafoil and/or parachute is not used at all for the lower airship alone, or the mated combination of the lower airship and payload airship (although such devices are still hosted by the upper airship). These embodiments rely on propulsive maneuvering, and control of heading and attitude via rudder and elevator, and the like, to manage drag of the lower airship (and lower airship+payload airship) and support station keeping.

In some embodiments, the payload airship 180 may have a plurality of mating fixtures and design features to allow transshipment of fluids from a first external airship (i.e., not the payload airship) to a second external airship, said external airships mated to a first and second of the plurality of mating fixtures. The design features may include plumbing, pumps and valves that can be employed to commandably deliver fluids (such as H2 in liquid or gaseous form) to e.g. internal storage devices (e.g., tanks) or another external airship.

As noted, the lower airship contains a reservoir of lifting gas to replenish the lifting gas of the upper airship using the shuttle 150. The reservoir may also be used to replenish the lifting gas of the lower airship itself, and the lifting gas of the payload airship.

Figure 2:
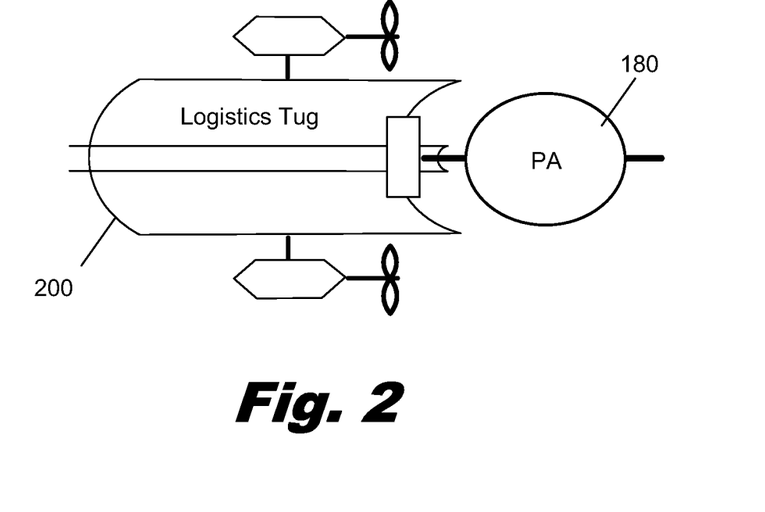
FIG. 2 illustrates a logistics airship mated to a payload airship, according to one example of principles described herein.

FIG. 2 illustrates a logistics airship 200 (a "logistics tug") adapted to shuttle a payload airship 180 between a ground station and a mission area, or between a ground station and another logistics airship (such as the lower airship 110 previously discussed), or between and among logistics airships. The logistics tug comprises standard housekeeping and command and control subsystems, energy storage, power generation, attitude control, propulsion, and maneuvering subsystems adapted to allow it to perform these shuttle missions in the intended atmospheric environment. In keeping with its intended mission, the logistics tug is designed to provide for robust and reliable operation near the ground and in the lower atmosphere, so as to minimize risk to the payload airship. In some embodiments, as illustrated in FIG. 2 which is styled after the logistics airship 620 described in U.S. application Ser. No. 13/048,625, the logistics tug comprises design features to grapple/mate to a payload airship at one point on the tug, and maneuver the payload airship to another point on the tug. This may be used, for example, to grapple a payload airship at the bow, move it to the stern, and subsequently move it back to the bow (or some other location). In some embodiments, the logistics tug is adapted to provide electrical power to the payload airship 180 while the payload airship 180 is mated to the logistics tug.

In some embodiments, the logistics tug additionally comprises a storage subsystem for fuel and/or lifting gas, and is adapted (through e.g. suitable plumbing, pumps, valves and mating fixtures) to deliver said fuel and/or lifting gas to another compatible airship through a mating fixture. The compatible airship could, for example, be the lower airship 110 illustrated in FIG. 1, or the payload airship 180 illustrated in FIG. 2. Thus, the logistics tug can, in some embodiments, perform the functions of a payload airship shuttle and a fuel/lifting gas tanker. It should be noted that the functions of a payload airship shuttle, and a fuel/lifting gas tanker, can also be performed by two separate logistics airships adapted to these individual tasks.

In some embodiments, the logistics tug comprises a plurality of mating fixtures, some or all of which are adapted to variously grapple a payload airship, mate to another logistics airship, provide electrical power, and exchange fluids in liquid or gaseous form.

NUMERICAL EXAMPLE

This section provides an exemplary sizing exercise for one embodiment of the inventive concept. It is not intended as a final or refined point design, which in any case would require a detailed consideration of currently-available materials and construction techniques, as well as detailed simulations of intended missions in the intended environments; instead, it is intended to expose some of the design considerations and tradeoffs particularly involved in the inventive concept.

For this sizing exercise, the payload airship, the upper airship that supports the tether, and the shuttle intended to resupply lifting gas to the upper airship, are assumed to be roughly spherical in shape. The payload airship is assumed to be mated to the front (or bow) of the lower airship 110. As a consequence, the payload airship does not support a parachute. Instead, the lower airship 110 supports both a parachute and a parafoil generally consistent with the concepts described in U.S. application Ser. No. 13/159,215 and U.S. application Ser. No. 13/227,966.

The payload airship is sized first. It is assumed to carry a payload that weighs 212 kg and two mating fixtures that each weigh 50 kg. A first mating fixture is configured to detachably connect the payload airship to the logistics tug and a second mating fixture is configured to detachably connect the payload airship to the lower airship. These may have interchangeable functions; indeed, in some embodiments the two mating fixtures are of identical construction.[2] It is assumed to normally rely on power from a larger airship to support housekeeping and payload operations. However, in order to support autonomous operations (optional), in this example it has a solar power capability for continuous housekeeping and payload operations (assumed to require 2 kW of power), and a hydrogen fuel storage and fuel cell capability for propulsion adapted to maintain an airspeed of 10 m/s for a period of 10 days. In general the payload airship is designed to achieve neutral buoyancy in the working altitude range of the lower airship. In this example, the payload airship is designed for neutral buoyancy at 18 km altitude, with a relative pressure differential between interior lifting space and ambient of 1 kPa, but has a hull designed for 2 kPa so as to support operations up to an altitude of 19 km (consistent with minimum altitude separation of the lower and upper airships). The hull, inclusive of all structural features and lifting spaces, is assumed to have a weight which scales as 560 grams per square meter of surface area for a sphere with internal volume equal to the required lifting volume of the airship. This scaling factor and methodology is similar to the hull design of the lower airship in U.S. application Ser. No. 13/159,215, although the payload airship is here assumed (for the numerical example) to be spherical instead of similar in shape to the NASA concept airship. The relatively robust hull, matching the sizing coefficient of the lower airship hull (which is similarly assumed to be 560 grams/m² of equivalent surface area), is intended to allow the payload airship to operate while mated to such a lower airship of a tethered airship system, considering the changes in altitude that may occur. It may be noted that, as the altitude separation of the tethered airship subsystem is reduced, the mated combination of the lower airship and the payload airship will both rise in altitude and become negatively buoyant. Because the two mated airships are not identical in size, the change in buoyancy will be different for the two airships. This can be compensated or mitigated, in some embodiments, by reliance on the control surfaces on either the lower airship or the payload airship (or both), or a change in the point at which the tether is effectively joined to the lower airship (and, therefore, the point of application of the tensile load).

[2]In an alternative embodiment, the payload airship has only a single mating fixture, and other system elements are employed to reliably demate the payload airship from one external airship (such as the logistics tug) and mate it to another external airship (such as the lower airship). This could include, for example, a robotic manipulator such as the robotic arms used on the Space Shuttle and International Space Station. With only a single mating fixture, trans-shipment of fluids through the payload airship could still be accommodated, although it would require temporary storage of fluid on the payload airship.

The power subsystem of the payload airship is roughly sized to include 8 kg of solar arrays based on typical solar incidence in the continental United States, substantially horizontal orientation of the array, array efficiency of 20%, and a peak to average safety factor of 1.75. A weight budget of 25 kg for a storage battery is arbitrarily assigned, as is a weight budget of 6 kg for power management and distribution (PMAD).

In addition to the solar power and storage capability, the payload airship includes stored hydrogen fuel and a system of fuel cells sufficient to drive a propulsion system adapted to achieve an airspeed of 10 m/s for 10 days. This component is affected by overall airship size, which in turn is affected by the weight of the supporting subsystems (including hydrogen storage, power generation and propulsion). It is assumed that fuel cells weight 6.1 kg/kW of output, are 50% efficient in terms of energy conversion, and that tankage has a mass fraction (H2 fuel versus total tankage plus fuel) of 0.268. The spherical payload airship is expected to have a higher drag coefficient than the lower airship or the NASA conceptual baseline from which the lower airship was derived; a drag coefficient of 0.1 is assumed for the payload airship in this example. Considering these factors, an iterative solution indicates that a payload airship of 40 m diameter could support all its associated subsystems including 69 kg for a propulsion subsystem and 616 kg of energy and power subsystems, of which 93 kg is fuel cells and 483 kg is tankage and stored hydrogen. Gross vehicle weight is slightly over 3800 kg. As will be appreciated, given the assessed weight of the energy and power subsystems, the overall design and sizing of this airship is dominated by the assumed need to support autonomous propulsion of 10 m/s airspeed for 10 days using stored hydrogen. Other design assumptions and mission requirements would affect the overall size, weight and cost of the airship, as would changes in assumed construction materials, sizing coefficients, and construction techniques (including, inter alia, overall shape). A greater reliance on solar energy could be examined for weight and cost impact within planned mission scenarios; however, this baseline is adopted for the present illustrative sizing exercise.

It is also noted that, as fuel is burned during autonomous operations, lifting gas can be vented (or used as a source of low-pressure fuel) in order to maintain neutral buoyancy close to a desired altitude.

The lower airship embodies the general concepts described in U.S. application Ser. No. 13/159,215 and U.S. application Ser. No. 13/227,966, and also supports a mating fixture in its bow for mating with the payload airship. The lower airship can resupply lifting gas to the payload airship (as well as stored fuel, if required), and can support all the electrical power needs of the payload airship while mated. The lower airship can also accept hydrogen (or some other fuel and/or lifting gas) through its mating fixture (e.g., from the payload airship), for example when a shuttle airship (described below) transships hydrogen through a payload airship.

The lower airship is assumed to rely entirely on renewable energy (solar) for its own needs, the needs of the payload airship, and propulsive station keeping when drag compensation with the upper airship is inadequate or imperfect. It is assumed that the lower airship can maintain a relative airspeed of 20 m/s using its propulsive capability alone, considering the combined drag of itself and the payload airship. For this sizing exercise, the assumed drag coefficient is taken from the NASA concept baseline and the effective surface area is calculated as the surface area of a similarly-shaped airship with a total lifting volume equal to the combined volumes of the lower airship and the payload airship. Detailed aerodynamic simulation and testing is recommended to refine these assumptions. The size and weight of the propulsion system depends on, inter alia, the effective size and effective drag coefficient of the combination of the lower airship and the payload airship. The size and weight of the energy and power subsystem (e.g., solar cells, battery, power distribution) depends on, inter alia, the need to support housekeeping and payload operations, and the expected need to rely on the propulsion system (which in turn requires an excess of energy collection and storage relative to baseline housekeeping and payload operations). Propulsion needs can be estimated with detailed mission simulations. For this sizing exercise, a propulsion subsystem of 171 kg, solar array complement of 115 kg, and battery of 375 kg are assumed. The total airship has a length of roughly 100 m, a lifting volume of roughly 45,000 m³, a hull mass of roughly 4200 kg, and a gross vehicle weight of roughly 5100 kg including a parafoil, parachute and tether attachment/deployment mechanism.

For this sizing example, the upper airship and balloon shuttle (i.e., used to resupply lifting gas to the upper airship) are assumed to be similar in size, shape and construction to those described in U.S. application Ser. No. 13/159,215 and U.S. application Ser. No. 13/227,966. As with the other airship sizing estimates, detailed mission simulations and analysis can serve to refine the estimated size and weight of the airships and their associated subsystems.[3]

[3] For example, a more detailed assessment of drag coefficient for the pumpkin-lobed design, under conditions of full inflation and partial inflation, might indicate an increase in the drag coefficient relative to the one assumed here (which was based on the NASA concept baseline). This could in turn lead to an increase in the estimated drag force on the balloon, under typical operational conditions, and an associated reduction in the required size and weight of the parachute associated with the upper airship.

The "logistics tug" used to transport the payload airship, and also perform resupply of consumables (e.g., hydrogen), may need to operate in peak winds for a significant period of time. Detailed mission simulation in the relevant operational environment is needed to develop a reasonable sizing estimate for this airship. However, as a single illustrative example, one among many alternative embodiments, the following assumptions may be adopted: a) it operates completely on stored hydrogen fuel; b) it supports payload airship housekeeping and payload operations while the payload airship is mated to it; c) the weight of the hull and lifting volume is estimated by multiplying the surface area of the lifting volume by 560 g/m²; d) the overall shape of the airship is similar to that of the NASA Concept 12; e) it is intended for a mission duration of 30 days over which time its average power consumption is half of the value required to achieve an airspeed of 56 m/s; f) the airship supports two mating fixtures and is adapted to shift the payload airship from one mating fixture to the other, if desired, with the total for these features and adaptations weighing 150 kg; and g) the sizes of the propulsion system, fuel cell stack and hydrogen tankage are determined using the same sizing coefficients as for the lower airship discussed above. If these assumptions are adopted for illustration, the logistics tug could be estimated at roughly 150 m in length, with a gross vehicle weight of about 15,400 kg, of which 8800 kg is hull, 2200 kg is propulsion, and 4200 kg is energy storage and power generation and distribution. It is emphasized that the logistics tug is preferably designed to operate in peak wind conditions for the operational environment of the lower airship of the tethered system (i.e. since it may have to rendezvous and mate with this airship, with or without a payload airship, under these conditions), but detailed mission simulations and requirements tradeoff analysis must still be performed to determine expected energy consumption over time, length of mission, and mitigation techniques if operating conditions exceed expectation. In other embodiments, the logistics tug may be intentionally designed to operate in conditions that are less severe (or more severe) than those baselined for the lower airship of the tethered airship system, or may be designed to operate in equivalent conditions, but for a shorter or longer period of time.

Operational Methods

Figure 3:
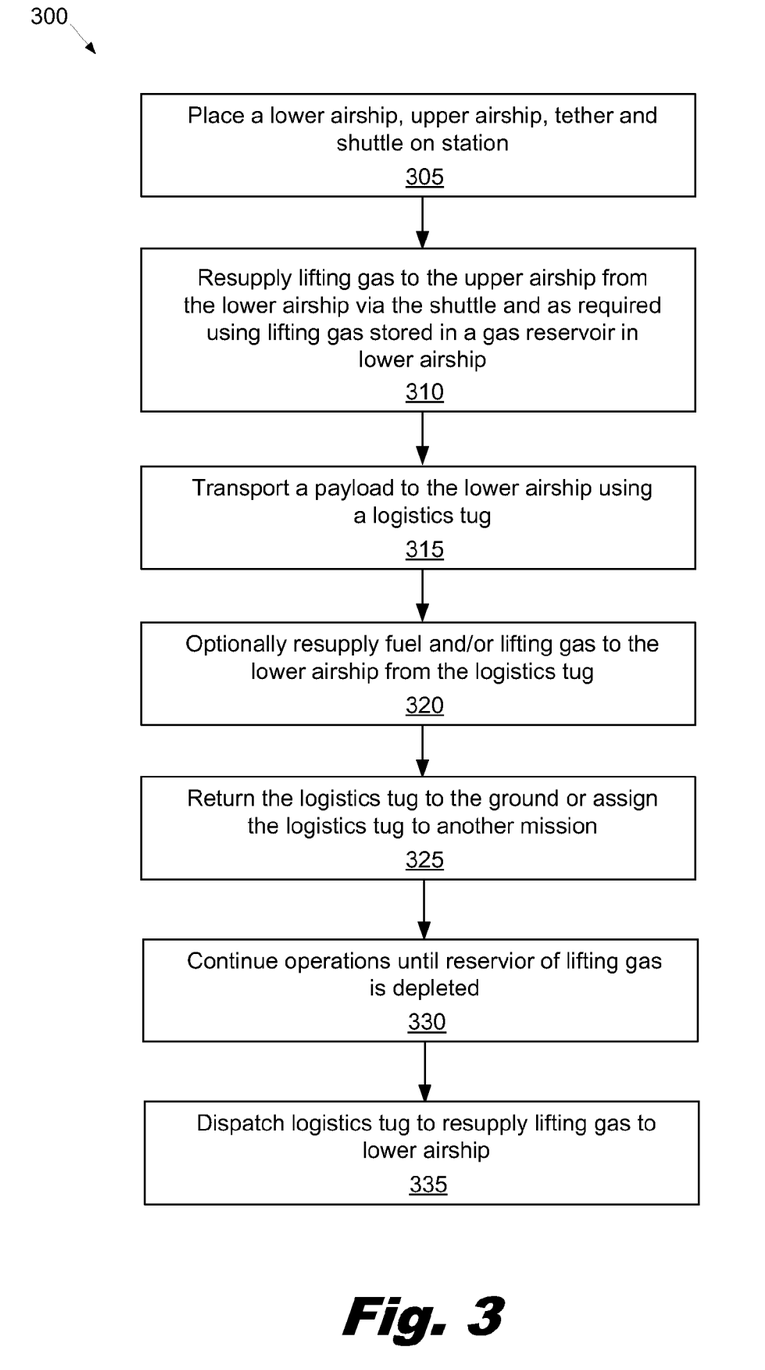
FIG. 3 is a flow chart of an illustrative method for long endurance stratospheric operations, according to one example of principles described herein.

FIG. 3 is a flowchart showing one illustrative method 300 for long term stratospheric airship operation. In typical operation, a tethered airship system comprising a lower airship 110, upper airship 120, tether 130 and shuttle 150 will be on-station in a desired mission area, but initially lack a payload airship adapted to perform a desired mission (step 305).[4] According to the concepts described in U.S. application Ser. No. 13/159,215 and U.S. application Ser. No. 13/227,966, the tethered airship system is able to perform station-keeping in the mission area with minimal expenditure of fuel (i.e., relying primarily on drag equalization between the lower and upper airships) and is able to resupply lifting gas to the upper airship from the lower airship, as required, relying on a stored gas reservoir in the lower airship 110 and a shuttle subsystem 150 riding on, or along, the tether as described in U.S. application Ser. No. 13/227,966 (step 310).

[4] Although, it is noted that useful payloads can also be installed on the lower airship 110, upper airship 120, and potentially even the tether 130 and/or shuttle 150.

At the start of a mission involving a payload airship, such as payload airship 180, the payload airship is shuttled from the ground to the lower airship 110 by a logistics airship 200 (the logistics tug) (step 315). Following rendezvous in the mission area, the logistics tug maneuvers (with the payload airship still mated/attached) to allow the payload airship to mate with the lower airship 110. The logistics tug may also, optionally, resupply fuel and/or lifting gas to the lower airship 110 through the payload airship, if the payload airship is adapted to trans-ship such fluids (step 320). Alternatively (and still optionally) the logistics tug may resupply fuel and/or lifting gas to the lower airship 110 through a separate mating fixture (if available) following demating/disengagement with the payload airship. Note that this separate mating fixture on the lower airship 110 was not included in the numerical sizing example given above.

Following completion of its delivery mission(s), the logistics tug may be returned to the ground or assigned to another mission (step 325).[5]

[5] The logistics airship 200 may also remain mated to the payload airship or the lower airship 110, pending a decision regarding further tasking.

For a period of time, the tethered airship system plus payload airship can perform a desired mission, maintain stationkeeping, and maintain suitable inflation of the various airships by relying on the reservoir of lifting gas contained in the lower airship 110. Eventually, the reservoir of lifting gas will be depleted or nearly depleted (step 330). At this time, the logistics airship 200 (or a similar airship adapted to support only a gas resupply mission) can be dispatched to resupply lifting gas to the lower airship (step 335). Rendezvous, mating, and resupply may be performed using the same or similar techniques employed during (and/or following) initial delivery of the payload airship. The resupply procedure can be repeated indefinitely while the overall system remains free of significant failures.

The inventive system provides long-term support for a payload in the stratosphere with a relatively low-cost support system. Preferably, the tethered airship system is able to provide station-keeping for itself and the attached payload with no expenditure of consumable fuels, relying only on relatively small and low-cost solar energy collection and storage systems, electric propulsion systems, and the like. Under normal operation, the only "consumable" (a resource that is depleted over time) is lifting gas. This is compensated primarily by a reservoir on the lower airship 110, and other features to deliver this lifting gas to the lifting volume of the lower airship 110, the upper airship 120, and the payload airship. When the reservoir of lifting gas on the lower airship 110 is depleted or nearly depleted, it can be resupplied by a logistics airship 200 dispatched for this purpose. The tethered airship and the payload airship remain in the stratosphere for months or years at a time (potentially indefinitely), thereby minimizing the risks of operating near the ground and in the lower atmosphere. The only element of the system that is consistently exposed to these risks is the logistics airship 200.

As generally described in U.S. App. No. 13/048,625, the tethered airship system and the logistics airship 200 may be "standardized" so as to support a variety of payload airships. In this way, development costs of the tethered airship system and logistics airships can be amortized over multiple missions and a standard mating subsystem can be used by multiple payload airships (thereby simplifying the design of the payload airships). The payload airships are relatively low-cost compared to custom stratospheric systems with embedded payloads, since the payload airships are not required to autonomously provide station-keeping for long periods of time in high winds. Furthermore, barring spares that may be required for catastrophic failures, only a single payload airship (and payload) is required for continuous mission operations (instead of multiple airships and payloads as would be required if several airships with custom payloads are cycled between the ground and a mission area to provide continuous operational support).

Rendezvous and Altitude Matching

Under normal operation, the lower airship 110 of the tethered airship system may operate over a range of altitudes (the numerical example described in U.S. application Ser. No. 13/159,215 operates over a nominal altitude range of 18-19 km, even though the lower airship by itself is negatively buoyant at the higher altitude). In order to provide for rendezvous and altitude matching, the logistics airship 200 (at least) should be designed to operate up to the highest design altitude of the lower airship 110. The payload airship may also be designed to achieve neutral buoyancy at this highest operating altitude of the lower airship 110, although this capability is not a required element of the inventive concept. If the payload airship is not designed to achieve neutral buoyancy at the highest design altitude of the lower airship 110, the logistics airship 200 should be designed to compensate for the marginal negative buoyancy (and asymmetric buoyancy for the combination of the logistics airship 200 and payload airship) that results from this constraint, so as to assure reliable rendezvous, mating, and demating throughout the altitude range (for rendezvous, mating and demating) expected to be experienced during operation of the system. Suitable accommodation could include, without limitation, additional lifting volume, augmented propulsion systems, lifting surfaces (aerodynamic control surfaces) which can be employed when airspeed is greater than zero, and mating fixtures that are adjustable with respect to attitude or mounting angle.

Preferably, the logistics airship 200 is adapted to adjust its nominal altitude within a design range by pumping lifting gas from a storage reservoir into a lifting volume (to increase altitude), or from a lifting volume into a storage reservoir (to decrease altitude), so as to perform altitude matching with the lower airship of the tethered airship system. Alternatively, in order to avoid the need for a high-pressure pump to move gas from a lifting volume into a storage reservoir, and recognizing that the logistics airship will be returned to the ground after a relatively short time, the logistics airship could vent lifting gas to the atmosphere in order to decrease altitude in a controlled manner.

Consideration of Subsystem Failures

If the payload suffers a substantial failure, the payload airship can be grappled (mated) with a logistics tug, demated from the lower airship 110, and returned to the ground for payload repair or replacement followed by a return to the mission area and re-mating with the lower airship 110. Alternatively, the entire payload airship (with payload) could be replaced with an identical or similar payload airship (and payload) assembled for this purpose. A single logistics tug, if adapted to support two mating fixtures (or at least docking fixtures) could remove a failed or defective payload airship and provide a replacement payload airship (of similar or different design, or even adapted to a different mission) in a single trip.

If the inventive system is adapted to support rendezvous and mating with a logistics tug under worst-case environmental conditions (e.g., peak wind) while the tethered airship system remains approximately at its previously-defined position, at least one of the logistics tugs in the system may have sufficient energy stores, power generation capability, and propulsion capability to also perform station-keeping under worst-case environmental conditions. However, if the tethered airship system is allowed to drift off-station, additional design tradeoffs become feasible. For example, the tethered airship system could be operated to allow a net drift in the direction of the winds experienced by the lower airship, thereby minimizing the propulsion power needed by the logistics tug for rendezvous and mating. Operating parameters of the tethered airship system, that could be adjusted to promote such a net drift, include the length of the tether, the lift and drag generated by the parafoil(s), and the drag generated by the parachute(s).

If the payload airship loses buoyancy, the tethered combination including the payload airship will descend to a lower altitude. If the balloon shuttle 150 is mated to the lower airship 110 and is able to receive lifting gas from the storage reservoir on lower airship 110, it may be partially or completely inflated to increase total buoyancy of the tandem combination. Also, the lower airship 110 may use its aerodynamic control surfaces, and optionally its propulsion capability (depending on ambient conditions) to trim out the tandem combination, if required, to enable grappling and mating of the payload airship by the logistics tug for return of the payload airship to the ground for refurbishment/repair. Additionally, if the tether attachment/deployment subsystem on the lower airship is adapted to allow a change in the point of attachment (specifically, adjusting the longitudinal point at which tension forces are applied), a shift of the point of attachment may be employed to minimize the trim forces required. It should be noted that additional adaptations may be needed to properly manage a buoyancy failure; for example, rapid venting capability of the balloon shuttle to prevent unintended and excessive altitude gain of the tethered airship subsystem following demating of the payload airship. Also, the logistics airship 200 may need to be designed (adapted) to rendezvous and mate with a lower airship (and payload airship) that has lost altitude, and may have asymmetric buoyancy and attitude, and it may also need to be designed (adapted) to maneuver reliably in the intended environment, and near the ground, while mated to a payload airship which has lost buoyancy.

If the payload and payload airship remains functional, and the tethered airship system maintains buoyancy but loses station-keeping capability due to a hardware failure, a logistics tug can be tasked to rendezvous with the system wherever it may have drifted, and return the payload airship (with its payload) to the mission area for short-term operations consistent with the energy stores of the logistics tug, pending delivery of a replacement tethered airship system that could support long-term operations. Of course, if such replacement cannot be achieved within the endurance of the logistics tug, it could be relieved by a second (or additional) logistics tug(s), or returned to the ground to await the availability of additional assets.

If the lower airship suffers a catastrophic loss of buoyancy, the payload airship can be demated (either by command from the ground or autonomously) so that it remains at (or returns to) roughly the correct operational altitude. It may drift with the wind if it has no autonomous propulsion capability (or if the prevailing winds exceed its propulsion capability). A limited propulsion capability is beneficial, even if it cannot overcome the ambient wind, since it allows the payload airship to at least maintain heading and attitude control (e.g., using standard aerodynamic control surfaces and its nonzero airspeed), thereby facilitating eventual rendezvous and mating with a logistics tug dispatched to recover it. It can then, e.g., be returned to the mission area for mating with a replacement tethered airship system.

If the upper airship suffers a catastrophic loss of buoyancy, the tandem combination of the lower airship and the payload airship may be unable to maintain station-keeping (depending on the ambient conditions) and may descend to a lower altitude since the weight of the upper airship and tether is now borne entirely by the lower airship. To overcome this problem, the tether can be retracted (reeled-in) and the upper airship can be jettisoned by releasing a latch, firing a set of explosive bolts, or other method (ideally at a place and time that minimizes danger to persons or property on the ground). Also, if the shuttle 150 is still attached to the lower airship and if it is still functional, it can be partially filled with lifting gas, while remaining latched/mated to the lower airship, to counterbalance the weight of the tether now borne by the lower airship. A logistics tug can rendezvous and mate with the payload airship, allowing the lower airship to demate and return to base (if it is able). The payload airship can then e.g. be returned to the mission area for mating with a replacement tethered airship system.

Similarly, if the tether fails, the lower airship and upper airship are no longer connected and the tandem combination of the lower airship and the payload airship may be unable to maintain station-keeping (depending on the ambient conditions) and may descend to a lower altitude since the weight of the remaining portion of the tether is now borne entirely by the lower airship. The portion of the tether that is still attached to the lower airship can be retracted (reeled-in). Also, if the shuttle 150 is still attached to the lower airship and if it is still functional, it can be partially filled with lifting gas, while remaining latched/mated to the lower airship, to counterbalance the weight of the tether. A logistics tug can rendezvous and mate with the payload airship, allowing the lower airship to demate and return to base (if it is able). The payload airship can then be e.g. returned to the mission area for mating with a replacement tethered airship system.

If the shuttle 150 fails, no immediate emergency response is warranted but the tethered airship system must be replaced over time (or the shuttle must be replaced) since the upper airship will steadily lose buoyancy. The entire tethered airship system can be replaced by maneuvering a replacement tethered airship system into the mission area and transferring the payload airship from the damaged system to the undamaged system. This can be achieved with the assistance of a logistics tug, although in some embodiments the transfer could be achieved by action of the payload airship and the two tethered airship systems alone. Following transfer of the payload airship to the undamaged tethered airship system, the damaged system can be maneuvered to a location where the upper airship can be safely jettisoned and ditched, the tether retraced (reeled-in), and the lower airship returned to base for repair. If the system is designed such that the lower airship alone cannot be safely recovered while carrying the tether, the tether can be deployed to its maximum length (possibly relying on commanded excess lateral drag forces to separate the lower and upper airships) and cut at or near its point of attachment to the tether attachment/deployment subsystem of the lower airship. In an alternative embodiment, the lower airship is designed to be safely recovered while carrying the full weight of the tether.

Alternative Embodiments and Operations Concepts

In one alternative embodiment, there is no payload airship although there is a payload that is delivered to a tethered airship system and mated directly to the lower airship (i.e., without being supported by a payload airship designed to counteract the weight of the payload). This external payload could either be retrieved by a logistics tug at a later date, or simply jettisoned when e.g. its mission is completed.

In another alternative embodiment, a "payload package" is attached. The payload package may comprise multiple payloads that can be separately retrieved or jettisoned.

In another alternative embodiment, the lower airship comprises multiple mating ports so as to accommodate multiple external payloads or payload packages.

In one alternative embodiment, all electrical power needs of the tethered airship system with attached payload airship (and payload) are satisfied with solar arrays and electrical storage and distribution systems on the lower airship, upper airship and potentially the payload airship. In another embodiment, at least a portion of the aforementioned electrical power needs are satisfied by hydrogen fuel cells relying on stored hydrogen. In this embodiment, a single reservoir may optionally be used on the lower airship for replenishment of lifting gas as well as fuel supply for power generation.

In one alternative embodiment, airships that are "mated" to one another are not required to be "docked" to one another. For example, a payload airship may be mated to a logistics airship (either a logistics tug or a lower airship of a tethered system) via a flexible member that does not provide for transfer of torque. It should also be noted that the logistics tug 200 can be used as an "aerial tugboat" to provide augmented propulsion and maneuvering to the lower airship.

It should also be noted that lifting gas (e.g., hydrogen) could be transported by the logistics tug 200 as a cryogenic liquid, and transferred to the lower airship and payload airship (directly or via trans-shipment) as a cryogenic liquid. This could potentially increase the hydrogen mass fraction of the storage reservoir on the lower airship, but would also have an impact on the mating technology, valves, pumps, and plumbing. Additionally, such a system would either have to accommodate boil-off of cryogen over time (this has an adverse impact on endurance, although the lifetime of the cryogenic reservoir could be sufficient to mitigate this concern), or support a cooling system to keep the cryogenic reservoir at a suitable temperature to prevent boil-off. Such a cooling system would place another load on the energy and power distribution system.

If lifting gas is handled as a cryogenic liquid, the cryogenic adaptations could be limited to the logistics tug and the lower airship alone (relying on liquid-to-gas transformation on the lower airship and gas-phase handling of lifting gas for the payload airship, balloon shuttle, and upper airship), or extended to some or all of these other airships. This could, for example, allow a relatively compact and light-weight reservoir of lifting gas on the upper airship (although as noted above, the system would have to deal with boil-off or active cooling, as well as cryogenic mating fixtures, valves, pumps and plumbing). Also, a balloon shuttle that transfers only cryogenic liquids would get more buoyant instead of less buoyant following transfer, so other accommodations would be necessary (e.g., venting of lifting gas from the balloon shuttle, or transfer of lifting gas from the balloon shuttle to the upper airship in addition to the transfer of the cryogenic liquid, or a tractor motor to pull the balloon airship down the tether despite its positive buoyancy).

One advantage of a cryogenic storage system is that the cryogenic liquid (or cold gas resulting from boil-off) could be used to cool certain instruments, such as infra-red cameras and the like, without requiring a separate cooling system.

With suitable enhancement of the mating structures and supporting apparatus, it would also be possible to transport and transfer lifting gas as a (relatively high-temperature) gas, and transport and transfer a cryogenic liquid, if required, for the same or other purposes such as payload operations.

In addition to the embodiments specifically described above, applicable embodiments, principles, and methods disclosed in co-pending application Ser. Nos. 13/048,625, 13/159,215, and 13/227,966 can be advantageously applied to the airship systems and operations.

In sum, the long term stratospheric airship systems and methods describe above provide for indefinite airship operations by replenishing/redistributing lifting gas, replacing/mitigating component and subsystem failures, and replenishing fuel supplies. Further, the long term stratospheric airship systems and methods minimize the overall cost and risk involved with airship operations by providing modularity, reducing energy required for station keeping, allowing modular airships to be replaced as necessary, and reducing the need for airship operations near the ground.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A tethered airship system for long endurance stratospheric operations comprising:
    an upper airship;
    a tether, a first end of the tether attached to the upper airship;
    a lower airship attached to a second end of the tether; and
    a payload airship reversibly mated to the lower airship;
    in which the tethered airship system is free flying and configured to maintain long duration stationkeeping and wherein the tether allows for vertical separations between the airships of at least of eight kilometers.

2. The system of claim 1, in which the payload airship comprises a lifting gas volume and a payload, the payload airship being configured to achieve neutral buoyancy at a working altitude of the lower airship.

3. The system of claim 1, in which the payload airship comprises two separate mating fixtures to allow a plurality of external airships to mate simultaneously to the payload airship.

4. The system of claim 1, further comprising a logistics tug airship configured to reversibly mate with the payload airship and deliver the payload airship to the lower airship.

5. The system of claim 1, further comprising a balloon shuttle configured to travel between upper and lower airships carrying lifting gas from the lower airship to the upper airship, the lifting gas providing buoyant lift for the balloon shuttle prior to transfer of the lifting gas from the balloon shuttle to the upper airship.

6. The system of claim 1, in which the lower airship comprises a replenishable reservoir of lifting gas.

7. The system of claim 6, further comprising a logistics tug airship is configured to:
    reversibly mate with the payload airship;
    deliver the payload airship to the lower airship; and
    deliver lifting gas to the replenishable reservoir.

8. The system of claim 7, in which the logistics tug airship is configured to deliver lifting gas to the lower airship through the payload airship.

9. The system of claim 1, in which the upper airship comprises a parafoil and parachute suspended from the upper airship, and spaced away from the upper airship, along the tether.

10. The system of claim 1, in which the payload airship comprises autonomous power generation, attitude control, and propulsion for short term unattended operations.

11. The system of claim 1, in which the lower airship is configured to supply at least two of lifting gas replenishment, stationkeeping capability, and relay communication for the payload airship.

12. The system of claim 1, in which at least one of the lower airship and the payload airship comprise a parachute or a parafoil.

13. The system of claim 1, further comprising an adjustable tether attachment on the lower airship, the adjustable tether attachment configured to change a point at which the tether is joined to the lower airship, the adjustable tether attachment being configured to compensate for differential buoyancy between the lower airship and the payload airship.

14. The system of claim 1, further comprising a logistics tug airship configured to:
    support the operation of the payload airship;
    have a mission duration of at least 30 days;
    support two mating fixtures; and
    shift the payload airship from one mating fixture to another.

15. An airship system comprising:
an upper airship;
a lower airship comprising a replenishable supply of lifting gas for transfer to the upper airship;
a tether, an upper end of the tether attached to the upper airship and a lower end of the tether attached to the lower airship, in which the airship system is free flying;
a balloon shuttle configured to accept lifting gas from the replenishable supply while it is mated to a docking fixture associated with the lower airship, travel up the tether to a docking fixture associated with the upper airship, and deliver at least a portion of the lifting gas to the upper airship;
a logistics airship; and
a payload airship configured to dock to both the lower airship and the logistics airship;
in which the logistics airship is configured to transport the payload airship to the lower airship and to transfer lifting gas to the replenishable supply.

16. A method for long term stratospheric airship operations comprising:
deploying a lower airship connected to an upper airship by a tether, a shuttle running along the tether to deliver lifting gas to the upper airship;
resupplying lifting gas to the upper airship from the lower airship via the shuttle using a supply of lifting gas stored in a gas reservoir in the lower airship;
transporting a payload to the lower airship using a logistics tug; and
returning the logistics tug to the ground.

17. The method of claim 16, further comprising:
continuing airship operations until the reservoir of lifting gas reaches a predetermined depletion level; and
dispatching the logistics tug to resupply lifting gas to the lower airship.

18. The method of claim 16, further comprising resupplying fuel to the lower airship from the logistics tug.

19. The method of claim 16, further comprising selecting operational altitudes for the lower airship and upper airship such that wind forces on the lower airship are in a substantially different direction than wind forces on the upper airship.

20. The method of claim 19, further comprising adjusting lift and drag compensation between the lower airship and upper airship to minimize stationkeeping power requirements.

21. A tethered airship system for long endurance stratospheric operations comprising:
an upper airship;
a tether, a first end of the tether attached to the upper airship;
a lower airship attached to a second end of the tether, and
a payload airship reversibly mated to the lower airship, said payload airship comprising a payload, said payload operable and operational at an altitude above 18 kilometers;
in which the tethered airship system is free flying and configured to maintain long duration stationkeeping.

* * * * *